United States Patent [19]

Van Hove

[11] Patent Number: 4,549,497

[45] Date of Patent: Oct. 29, 1985

[54] DEVICE FOR UNDERWATER SEALING PORTS OR SIMILAR, NOTABLY THE BOTTOM TRAPS FROM HOPPER BARGES

[75] Inventor: Emile Van Hove, 'S-Gravenwezel, Belgium

[73] Assignee: Dredging International, Zwijndrecht, Belgium

[21] Appl. No.: 557,608

[22] Filed: Dec. 2, 1983

[30] Foreign Application Priority Data

Jan. 19, 1983 [BE] Belgium .................................. 209931

[51] Int. Cl.[4] .............................................. E06B 7/16
[52] U.S. Cl. .................................. 114/36; 114/201 A; 114/201 R; 49/477
[58] Field of Search ................ 114/36, 27, 26, 120, 114/174, 201 R, 201 A, 202; 49/477; 91/25, 417 R

[56] References Cited

U.S. PATENT DOCUMENTS

| 3,069,861 | 12/1962 | Berke ..................... 49/477 |
| 3,126,050 | 3/1964 | Lapof ..................... 49/477 |
| 3,694,962 | 10/1972 | McDonald ................ 49/477 |
| 4,256,017 | 3/1981 | Eastman ................ 91/417 R |
| 4,276,809 | 7/1981 | Kast ..................... 91/417 R |

*Primary Examiner*—Trygve M. Blix
*Assistant Examiner*—C. T. Bartz
*Attorney, Agent, or Firm*—Scully, Scott, Murphy & Presser

[57] ABSTRACT

There is described a device for underwater sealing ports or similar, whereby sliding panels are shifted along discharge openings, in which rubber sections are mounted about said discharge openings, in frames secured to a vessel side, and means are provided to exert a hydraulic pressure on said rubber sections.

4 Claims, 4 Drawing Figures

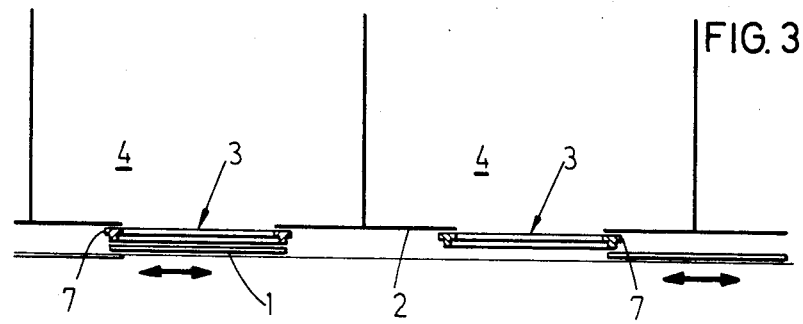
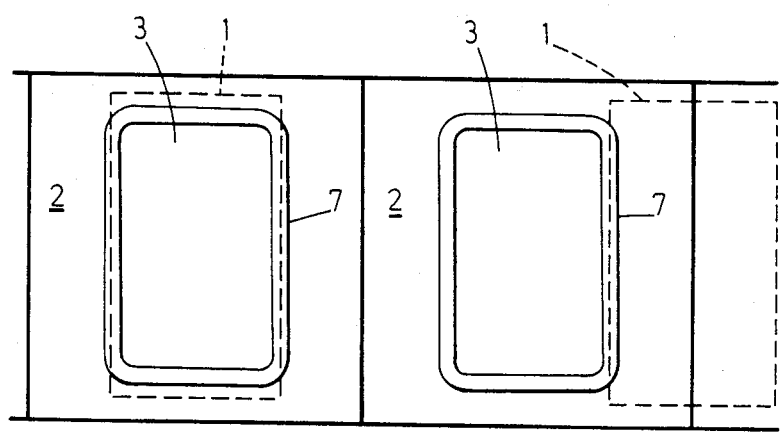

DEVICE FOR UNDERWATER SEALING PORTS OR SIMILAR, NOTABLY THE BOTTOM TRAPS FROM HOPPER BARGES

This invention relates to a device for underwater sealing ports or similar, notably the bottom traps from hopper barges, hopper dredges, trap hoppers or similar vessels, whereby sliding panels may be shifted along discharge openings.

Even if the invention will be described as applied to hopper barges, hopper dredges, trap hoppers or similar vessels, it is clear that it may also be applied whenever sealing is to be obtained in a ship side or in a dredge line valve for example. The wording dredge line refers to any kind of line for conveying on land or sea dredgings on the basis of water and sand, gravel, ore and similar.

It has already been proposed for sealing-off sliding panels, to provide between the ship side, about the discharge openings, and the sliding panels, a seal which is essentially comprised of a hollow rubber sealing element which presses against the sliding panel whenever it lies under pressurized air. To release the sliding panel and shift same along the discharge opening, it is but necessary to let the air escape from said hollow sealing element. The pressure of the rubber sealing element against the sliding panel thus stops in such a way that the sliding panel may be shifted through conventional means along guides provided therefor.

The drawback of such hollow rubber sealing elements is the vulnerability thereof relative to materials such as stones, cobbles or similar hard materials which may be present in the dredgings. A leak in the hollow rubber sealing element makes said element directly useless. A good sealing is an essential requirement whenever very fine and homogeneous materials such as silt are dredged.

The invention has for object to obviate said drawback and other drawbacks and to provide an original seal which operates perfectly and has a markedly extended life duration.

For this purpose, rubber sections are mounted about said discharge openings, in frames secured to the side or wall of the vessel, and means are provided to exert on said rubber sections a hydraulic pressure, in such a way that said sections move in the direction of said ports, for example sliding panels, or are removed therefrom.

According to an advantageous embodiment of the invention, said rubber sections have in cross-section a larger head which faces inwards, that is towards a chamber provided in said frames, chamber in which a pressurized liquid may be fed or released therefrom, and a smaller portion which faces outwards, towards the ports to be sealed, while between said larger head and said smaller portion is further provided on either side of the lengthwise symmetry plane of said section, a continuous space which is permanently filled with pressurized liquid, in such a way that said rubber section due to the differential action, is removed from the pertaining port as the liquid pressure disappears in said chamber.

Other details and features of the invention will stand out from the following description, given by way of non limitative example and with reference to the accompanying drawings, in which:

FIG. 3 is a diagrammatic lengthwise section view whereby one sliding panel is shown in the closed position and the other sliding panel is shown in the open position.

FIG. 4 is a diagrammatic bottom view of two discharge openings with the position of the corresponding sliding panels from FIG. 3 shown in dotted lines.

The seal as shown in the figures is designed for sealing sliding panels 1 in the bottom wall or side 2 of a hopper vessel. The sliding panels 1 close off discharge openings 3 (FIGS. 3 and 4) and are thus shown diagrammatically in said figures in the open and closed position. The discharge openings 3 lie at the bottom in the side of the vessel and are intended to retain the dredgings dumped in the well 4 and to discharge same in the suitable moment. The bottom of the well shown in 2, is visible in the figures, while the ship side proper and the guides along which the sliding panels are shifted, have not been shown not to overburden unnecessarily the drawings.

Figure 1:
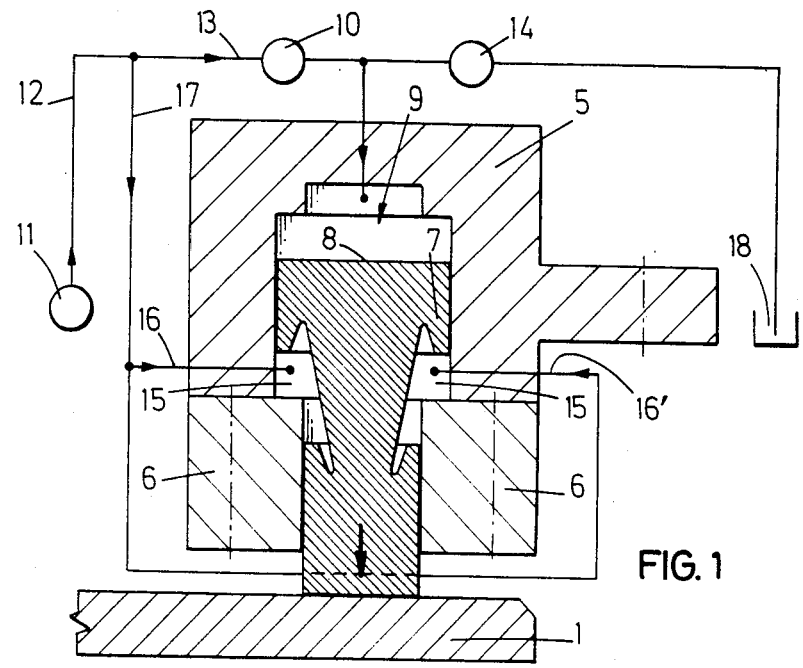
FIG. 1 is a cross-section view through a steel frame with associated rubber section, in that position where said section is retained pressed against a sliding panel.
Figure 2:
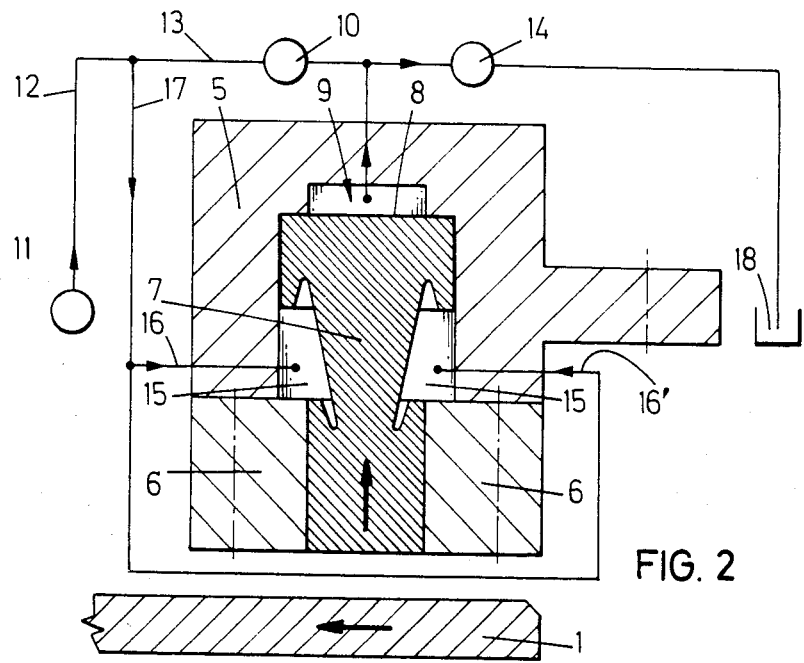
FIG. 2 is a cross-section view through a steel frame with associated rubber section, in that position where said section is removed from the sliding panel.

About each discharge opening 3 a U-shaped steel frame 5 has been arranged on the bottom side 2. Said U-shaped steel frame has on the outer side, that is the side facing the sliding panels 1, a narrower portion formed by two sections 6 which are secured to two flanges of the U-shaped frame 5 after arranging the rubber section 7 in said U-shaped frame. Indeed the rubber section 7 has an enlarged portion or head 8. With reference to FIGS. 1 and 2, it will be noted that said rubber section 7 has in cross-section the shape of a piston which is movable inside a chamber 9 between the flanges of the U-shaped frame section 5.

The retaining pressed of the rubber section 7 occurs hydraulically with a pressurized liquid which is fed to said chamber 9. To feed pressurized liquid to chamber 9, a valve 10 is opened to let the liquid pressurized by pump 11 reach chamber 9 through lines 12 and 13. While valve 10 is opened and said rubber section 7 moves to that position as shown in FIG. 2 or lies in said position, a valve 14 remains closed.

The rubber section which has moved due to the hydraulic pressure inside chamber 9, to the pertaining port, is then retained pressed by the hydraulic pressure inside said chamber 9, against the contact surface of the pertaining port which insures the sealing of said port.

To obtain a good sealing and to prevent entering of silt, sand and similar, continuous spaces 15 which are provided on either side of the lengthwise symmetry plane of the rubber section 7, are also set under hydraulic pressure. This occurs through lines 16 and 16' which both branch off from a line 17 which branches in turn from line 12. It is to be noticed that the pressure inside the spaces 15 is always retained which enhances the sealing of the smaller portion from said rubber section 7.

Due to the specific shape of the rubber section 7 are formed not only on either side of the lengthwise symmetry plane, said continuous spaces 15 which are permanently filled with a pressurized liquid, but also due to the differential action, the rubber section 7 may be brought to the so-called open position of the sliding panels 1. Indeed when valve 10 is closed while valve 14 is opened, the pressure inside chamber 9 drops and the required pressure remains inside spaces 15, so that due to said differential action, the rubber section 7 is removed from the pertaining sliding panel 1. The larger portion of head 8 of said rubber section 7 fills chamber 9 as shown in FIG. 2. The pertaining sliding panel is thereby released and may be displaced sidewise away from underneath the discharge opening as shown in the right-hand portion of FIG. 4.

Due to the compact and massive structure of the rubber sections 7, heavy damages which might put the seal out of action are not to be feared. Due to the choice in the shape of said rubber section 7, this section may be fittingly slid between the flanges of the steel frame 5 as well as between the sections 6. The metal sections 6 are removably mounted relative to the flanges of the steel frame 5.

Even if water performs very well in the seal according to the invention when the sliding panels are the ports from a bottom-discharge vessel or similar, the device according to the invention may also operate in some cases with oil. In both cases a tank 18 is to be provided at the end of line 14.

It is clear that the invention is not limited to the above-described embodiment nor to the use with sliding panels from bottom-discharge vessels or similar. The seal may be used wherever a space has to be closed water-tight temporarily. This is thus also valid for some ship ports and bagger line valves. Rubber sections according to the invention may be bent with relatively short radius in such a way that the openings to be closed or sealed may as well be circle-shaped or of quadrangle shape with rounded corners.

I claim:

1. Apparatus for sealing a panel around an opening in a vessel, comprising:

a frame to connect the apparatus to the vessel, and forming a downwardly facing channel adapted to extend around the vessel opening;

a sealing element slidably mounted in the channel, and including spaced apart top and bottom heads extending transversely across the channel, the top head having a larger transverse length than the bottom head;

the frame and the top head of the sealing element forming an upper chamber, above the top head;

the frame and the top and bottom heads of the sealing element forming a lower chamber, between the top and bottom heads;

first fluid lines means connected to the top chamber to conduct pressurized fluid thereinto to move the sealing element downward and into sealing engagement with the panel, and to discharge pressurized fluid from the top chamber;

second fluid line means connected to the lower chamber to conduct pressurized fluid thereinto to move the sealing element upward away from sealing engagement with the panel, and to discharge pressurized fluid from the lower chamber; and valve means located in the first fluid line means to control the flow of pressurized fluid therethrough.

2. Apparatus according to claim 1 wherein: the frame includes (i) a top wall,
(ii) a pair of spaced, side flanges extending downward from the top wall, and
(iii) a pair of spaced, side sections releasably secured to and extending downward from the side flanges;

the side flanges form a top portion of the channel, and the top head of the sealing element is mounted therein, the side sections form a lower portion of the channel, and the bottom head of the sealing element is mounted therein; and the width of the lower portion of the channel is less than the width of the upper portion of the channel, and the side sections limit downward movement of the top head in the channel and lock the sealing element therein.

3. Apparatus according to claim 1 wherein:

the top head of the sealing element extends transversely completely across the groove, over the entire length thereof, to seal the upper chamber from the lower chamber; and reciprocating movement of the top head of the sealing element in the groove moves the bottom head of the sealing element downward and upward.

4. Apparatus according to claim 3 wherein:

a bottom surface of the top head forms a first pair of grooves adjacent to the frame to facilitate maintaining a seal between the top head and the frame and between the upper and lower chambers; and a top surface of the bottom head forms a second pair of grooves adjacent to frame to facilitate maintaining a seal between the bottom head and the frame.

* * * * *